United States Patent
Jarvie et al.

(10) Patent No.: US 8,726,011 B1
(45) Date of Patent: *May 13, 2014

(54) SYSTEMS AND METHODS FOR MANAGING DIGITAL CERTIFICATES

(71) Applicant: JPMorgan Chase Bank, N.A., New York, NY (US)

(72) Inventors: Jay C. Jarvie, Downers Grove, IL (US); Leonid Vayner, Brooklyn, NY (US); Clive Anthony Payne, New Milton (GB)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/896,925

(22) Filed: May 17, 2013

Related U.S. Application Data

(63) Continuation of application No. 12/122,944, filed on May 19, 2008, now Pat. No. 8,473,735.

(60) Provisional application No. 60/938,575, filed on May 17, 2007.

(51) Int. Cl.
| | |
|---|---|
| *G06F 11/30* | (2006.01) |
| *H04L 9/00* | (2006.01) |
| *G06F 21/00* | (2013.01) |
| *G06F 21/64* | (2013.01) |
| *H04L 9/32* | (2006.01) |

(52) U.S. Cl.
CPC ............... *G06F 21/00* (2013.01); *G06F 21/64* (2013.01); *H04L 9/00* (2013.01); *H04L 9/3268* (2013.01)
USPC ........... 713/156; 713/175; 713/176; 380/277; 380/278; 726/10

(58) Field of Classification Search
CPC ....... G06F 21/00; G06F 21/64; H04L 9/3268; H04L 9/00
USPC ............................ 713/156, 173–176; 726/10; 380/277–278
See application file for complete search history.

(56) References Cited

U.S. PATENT DOCUMENTS

| | | | |
|---|---|---|---|
| 3,705,385 A | 12/1972 | Batz | |
| 3,860,870 A | 1/1975 | Furuya | |

(Continued)

FOREIGN PATENT DOCUMENTS

| | | |
|---|---|---|
| CA | 2430549 | 6/2002 |
| DE | 19731293 | 1/1999 |

(Continued)

OTHER PUBLICATIONS

ABC News Internet Ventures, Getting Smart with Java, http://abcnews.go.com/sections/DailyNews/amex_java000606.html (last visited Jun. 6, 2000).

(Continued)

*Primary Examiner* — Andrew Nalven
*Assistant Examiner* — Amir Mehrmanesh
(74) *Attorney, Agent, or Firm* — Lowenstein Sandler LLP

(57) ABSTRACT

A method of managing a digital certificate by a computer system can include the steps of receiving, the at the computer system, a business request for a digital certificate from a requester and transmitting, by the computer system, the request to a first approver. The method can further include, upon approval by the first approver, transmitting, by the computer system, the request to a second approver, upon approval by the second approver, transmitting, by the computer system, the request to a certificate manager, transmitting, by the computer system, the request to an implementer and receiving, by the computer system, from the implementer, technical information related to the request and transmitting, by the computer system, a certificate to a certificate supplier.

16 Claims, 10 Drawing Sheets

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,212,792 A | 5/1993 | Gerety et al. |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,315,504 A | 5/1994 | Lembie |
| 5,317,683 A | 5/1994 | Hager et al. |
| 5,321,841 A | 6/1994 | Eat |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davies et al. |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Green |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scarmer |
| 5,642,419 A | 6/1997 | Rosen |
| 5,644,493 A | 7/1997 | Motai |
| 5,644,778 A | 7/1997 | Burks et al. |
| 5,649,118 A | 7/1997 | Carlisle et al. |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray et al. |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holmann |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid et al. |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |

(56) References Cited

U.S. PATENT DOCUMENTS

| | | |
|---|---|---|
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,190 A | 12/1998 | Kleehammer et al. |
| 5,848,400 A | 12/1998 | Change |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakely, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,718 A | 2/1999 | Spector |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Change |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelly et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Hoyt et al. |
| 6,070,147 A | 5/2000 | Harms et al. |
| 6,070,153 A | 5/2000 | Simpson |

(56) References Cited

U.S. PATENT DOCUMENTS

| | | |
|---|---|---|
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,642 A | 9/2000 | Brown et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,113 A | 12/2000 | Mora et al. |
| 6,161,182 A | 12/2000 | Nadooshan |
| 6,164,533 A | 12/2000 | Barton |
| 6,170,011 B1 | 1/2001 | Macleod Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,066 B1 | 3/2001 | Barkley |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthan |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,223,168 B1 | 4/2001 | McGurl et al. |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,330,543 B1 | 12/2001 | Kepecs |
| 6,332,192 B1 | 12/2001 | Boroditsky et al. |
| 6,336,104 B1 | 1/2002 | Walker et al. |
| 6,339,423 B1 | 1/2002 | Sampson et al. |
| 6,343,279 B1 | 1/2002 | Bissonette et al. |
| 6,343,323 B1 | 1/2002 | Kalpio et al. |
| 6,345,261 B1 | 2/2002 | Feidelson |
| 6,349,242 B2 | 2/2002 | Mahaffey |
| 6,349,336 B1 | 2/2002 | Sit et al. |
| 6,363,381 B1 | 3/2002 | Lee et al. |
| 6,366,682 B1 | 4/2002 | Hoffman et al. |
| 6,381,587 B1 | 4/2002 | Guzelsu |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,430,688 B1 * | 8/2002 | Kohl et al. ............ 713/156 |
| 6,438,594 B1 | 8/2002 | Bowman-Amuah |
| 6,438,666 B2 | 8/2002 | Cassagnol et al. |
| 6,446,053 B1 | 9/2002 | Elliott |
| 6,449,765 B1 | 9/2002 | Ballard |
| 6,453,353 B1 | 9/2002 | Win et al. |
| 6,460,141 B1 | 10/2002 | Olden |
| 6,470,357 B1 | 10/2002 | Garcia, Jr. et al. |
| 6,484,149 B1 | 11/2002 | Jammes |
| 6,487,641 B1 | 11/2002 | Cusson et al. |
| 6,490,601 B1 | 12/2002 | Markus et al. |
| 6,493,677 B1 | 12/2002 | Von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,498,657 B1 | 12/2002 | Kuntz et al. |
| 6,507,912 B1 | 1/2003 | Matyas et al. |
| 6,510,523 B1 | 1/2003 | Perlman et al. |
| 6,519,763 B1 | 2/2003 | Kaufer et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,609,106 B1 | 8/2003 | Robertson |
| 6,609,113 B1 | 8/2003 | O'Leary et al. |

(56) References Cited

U.S. PATENT DOCUMENTS

| | | |
|---|---|---|
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,671,818 B1 | 12/2003 | Mikurak |
| 6,675,261 B2 | 1/2004 | Shandony |
| 6,684,248 B1 | 1/2004 | Janacek et al. |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,388 B1 | 7/2004 | Tsimelzon |
| 6,766,370 B2 | 7/2004 | Glommen et al. |
| 6,769,605 B1 | 8/2004 | Magness |
| 6,772,146 B2 | 8/2004 | Khemlani et al. |
| 6,775,782 B1 * | 8/2004 | Buros et al. .......... 726/2 |
| 6,785,810 B1 | 8/2004 | Lirov et al. |
| 6,789,115 B1 | 9/2004 | Singer et al. |
| 6,792,572 B1 | 9/2004 | Frohlick |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,832,587 B2 | 12/2004 | Wampula et al. |
| 6,847,991 B1 | 1/2005 | Kurapati |
| 6,856,970 B1 | 2/2005 | Campbell et al. |
| 6,868,391 B1 | 3/2005 | Hultgren |
| 6,892,231 B2 | 5/2005 | Jager |
| 6,907,566 B1 | 6/2005 | McElfresh et al. |
| 6,925,481 B2 | 8/2005 | Singhal et al. |
| 6,934,848 B1 | 8/2005 | King et al. |
| 6,937,976 B2 | 8/2005 | Apte |
| 6,938,158 B2 | 8/2005 | Azuma |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,006,983 B1 | 2/2006 | Packes et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,051,199 B1 | 5/2006 | Berson et al. |
| 7,051,330 B1 | 5/2006 | Kaler et al. |
| 7,058,817 B1 | 6/2006 | Ellmore |
| 7,076,453 B2 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,117,239 B1 | 10/2006 | Hansen |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,185,094 B2 | 2/2007 | Marquette et al. |
| 7,188,181 B1 | 3/2007 | Squier et al. |
| 7,197,470 B1 | 3/2007 | Arnett |
| 7,203,909 B1 | 4/2007 | Horvitz et al. |
| 7,299,201 B2 | 11/2007 | Jammes |
| 7,321,864 B1 | 1/2008 | Gendler |
| 7,370,011 B2 | 5/2008 | Bennett |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0027474 A1 | 10/2001 | Nachman et al. |
| 2001/0029464 A1 | 10/2001 | Schweitzer |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2001/0054059 A1 | 12/2001 | Marks et al. |
| 2002/0002479 A1 | 1/2002 | Almog et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0069172 A1 | 6/2002 | Omshehe et al. |
| 2002/0077964 A1 | 6/2002 | Brody et al. |
| 2002/0077978 A1 | 6/2002 | O'Leary et al. |
| 2002/0087447 A1 | 7/2002 | McDonald et al. |
| 2002/0087471 A1 | 7/2002 | Ganesan et al. |
| 2002/0095443 A1 | 7/2002 | Kovack |
| 2002/0099826 A1 | 7/2002 | Summers et al. |
| 2002/0099936 A1 | 7/2002 | Kou et al. |
| 2002/0104006 A1 | 8/2002 | Boate et al. |
| 2002/0104017 A1 | 8/2002 | Stefan |
| 2002/0107788 A1 | 8/2002 | Cunnhingham |
| 2002/0143874 A1 | 10/2002 | Marquette et al. |
| 2002/0152163 A1 | 10/2002 | Bezos et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1 | 11/2002 | Clifford et al. |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edwards et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0149594 A1 | 8/2003 | Beazley et al. |
| 2003/0154171 A1 | 8/2003 | Karp et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |

(56) References Cited

U.S. PATENT DOCUMENTS

| | | | |
|---|---|---|---|
| 2003/0163733 | A1 | 8/2003 | Barriga-Caceres et al. |
| 2003/0167229 | A1 | 9/2003 | Ludwig et al. |
| 2003/0177067 | A1 | 9/2003 | Cowell et al. |
| 2003/0191549 | A1 | 10/2003 | Otsuka et al. |
| 2003/0204460 | A1 | 10/2003 | Robinson et al. |
| 2003/0225688 | A1 | 12/2003 | Dobbins |
| 2004/0031856 | A1 | 2/2004 | Atsmon et al. |
| 2004/0049702 | A1 | 3/2004 | Subramaniam et al. |
| 2004/0117409 | A1 | 6/2004 | Scahill et al. |
| 2004/0153378 | A1 | 8/2004 | Perkowski |
| 2004/0215514 | A1 | 10/2004 | Quinlan |
| 2004/0254991 | A1 | 12/2004 | Malik et al. |
| 2005/0069136 | A1* | 3/2005 | Thornton et al. ............ 380/277 |
| 2005/0080747 | A1 | 4/2005 | Anderson et al. |
| 2005/0082362 | A1 | 4/2005 | Anderson et al. |
| 2005/0086160 | A1 | 4/2005 | Wong et al. |
| 2005/0086177 | A1 | 4/2005 | Anderson et al. |
| 2005/0091126 | A1 | 4/2005 | Junger |
| 2005/0120180 | A1 | 6/2005 | Schornbach et al. |
| 2005/0154877 | A1* | 7/2005 | Trench ......................... 713/156 |
| 2005/0193056 | A1 | 9/2005 | Schaefer et al. |
| 2005/0210254 | A1* | 9/2005 | Gabryjelski et al. .......... 713/175 |
| 2005/0251852 | A1* | 11/2005 | Patrick et al. ..................... 726/1 |
| 2005/0278641 | A1 | 12/2005 | Mansour et al. |
| 2006/0029261 | A1 | 2/2006 | Hoffman et al. |
| 2006/0116949 | A1 | 6/2006 | Wehunt et al. |
| 2006/0274970 | A1 | 12/2006 | Seki et al. |
| 2007/0028111 | A1* | 2/2007 | Covely .......................... 713/176 |
| 2007/0118892 | A1* | 5/2007 | Sastry et al. .................... 726/10 |

FOREIGN PATENT DOCUMENTS

| | | |
|---|---|---|
| EP | 855659 | 7/1998 |
| EP | 884877 | 12/1998 |
| EP | 917119 | 5/1999 |
| EP | 1014318 | 6/2000 |
| EP | 1022664 | 7/2000 |
| EP | 1056043 | 11/2000 |
| EP | 1089516 | 4/2001 |
| JP | 10187467 | 7/1998 |
| JP | 2003-24329 | 11/2000 |
| JP | 2001-134672 | 5/2001 |
| JP | 2005-242976 | 9/2005 |
| WO | 97/43736 | 11/1997 |
| WO | 99/40507 | 8/1999 |
| WO | 99/52051 | 10/1999 |
| WO | 00/68858 | 11/2000 |
| WO | 01/18656 | 3/2001 |
| WO | 01/35355 | 5/2001 |
| WO | 01/43084 | 6/2001 |
| WO | 01/88659 | 11/2001 |
| WO | 02/17082 | 2/2002 |
| WO | 2004/079603 | 9/2004 |

OTHER PUBLICATIONS

Amy Cortese et al, Cyberspace: Crafting software that will let you build a business out there, Bus. Week, Feb. 27, 1995, at 78.

Amy K. Larsen, Internet Goes to Work for Builders, InternetWeek, Nov. 16, 1998, at 26.

Anne Knowles, Improved Internet security enabling on-line commerce, PC Week, Mar. 20, 1995.

Anne Thomas, Sun Microsystems, Enterprise Javabeans Technology, http://java.sun.com (last visited May 21, 1999).

Associates National Bank (Delaware), Our Cards, http://www.theassociates.com (last visited Apr. 6, 1999).

Aversion Therapy: Banks overcoming fear of the 'Net to develop safe Internet-based payment system with Netscape Communicator, Network World, Dec. 12, 1994.

Barry D. Bowen, Sun Microsystems, Banking on JAVA Technology, http://java.sun.com (last visited May 21, 1999).

Bechtel Construction Operations Incorporated Standardizes on Primavera's Expedition Contract Management Software, Bus. Wire, Jul. 27, 1999.

Calyx Software, POINT for Windows Version 3.x Interface Marketing Guide (Dec. 8, 1999).

David Bank, Cash, Check, Charge—what's next?, Seattle Times, Mar. 6, 1995, at D-1.

David D. Owen, Facilities Planning and Relocation 108, 110, 112-114, 117-127, 137-138, 199-217, 241, 359 (R.S. Means Company, Inc. 1993).

David G. Cotts, The Facility Management Handbook 135-40 (2d ed. 1998).

David P. Kormann et al, Risks of the Passport Single Signon Protocol, 33 Computer Networks 51-58 (2000).

David Post, E-Cash: Can't Live With It, Can't Live Without It, Am. Lawyer, Mar. 1995, at 116.

Dominique Deckmyn, San Francisco Manages $45M Project Via Web-Based Service, ComputerWorld, Aug. 9, 1999, at 14.

Don Clark, Microsoft, Visa to Jointly Develop PC Electronic-Shopping Software, Wall St. J., Nov. 9, 1994, at B9.

eCharge Corporation, http://www.echarge.com/company/index.htm (last visited Dec. 3, 1999).

FreeMarkets Online, Inc., http://www.freemarkets.com (last visited Apr. 1999).

G&D America's Multi-application Smart Card Selected for Combined Payroll and 'Virtual Banking' Program in Mexico, Bus. Wire, Apr. 24, 1998.

GE TPN Post Service Use Guidelines, Getting Started (Apr. 26, 1999).

GE TPN Post Service Use Guidelines, Resource Center (Apr. 26, 1999).

Gerry Vandenengel, Cards on the Internet: Advertising on a $3 Bill, World Card Tech., Feb. 1995, at 46.

Harris InfoSource, http://www.harrisinfo.com (last visited Apr. 26, 1999).

Hewlett-Packard Co., Understanding Product Data Management (Apr. 26, 1999).

Jeffrey Kutler, A different drummer on the data highway, Am. Banker, May 12, 1995, at 14.

Jeffrey Kutler, Cash Card Creator Looking Beyond Mondex, Am. Banker, Feb. 9, 1995, at 16.

John N. Frank, Beyond direct mail, Credit Card Mgmt., Aug. 1996, at 54.

Jonathan Berry et al, Database: A Potent New Tool for Selling, Bus. Week, Sep. 5, 1994, at 56.

Karen Epper, A player goes after big bucks in cyberspace, Am. Banker, May 5, 1995, at 17.

Keith Brown, The Builder's Revolution. BuildNet Publishing (1996).

Kennedy Maiz, Fannie Mae on the Web, Newsbyte, May 8, 1995.

Kim A. Strassel, Dutch Software Concern Experiments with Electronic 'Cash' in Cyberspace, Wall St. J., Apr. 17, 1995, at B6.

Ko Fujimura et al, A World Wide Supermarket Scheme Using Rights Trading System, Proc. 7th Int'l Conf. on Parallel and Distributed Systems: Workshops, pp. 289-294 (Jul. 2000).

Ko Fujimura et al, XML Voucher: Generic Voucher Language, Internet Engineering Task Force, http://www.

Lester D. Taylor, Telecommunications Demand Analysis in Transition, IEEE Proc. 31st Int'l Conf. on System Sciences, pp. 409-415 (1998).

Lynda Radosevich, Is workflow working?, CNN.com (Apr. 6, 1999), http://www.cnn.com/TECH/computing/9904/06/workflow.ent.idg.

M. Alshawi et al, An IFC Web-Based Collaborative Construction Computer Environment: Wisper, Proc. Int'l Conf. Construction IT (1999).

Markus Jakobsson et al, Secure and lightweight advertising on the Web, 31 Computer Networks 1101-1109 (1999).

Marvin Sirbu et al, NetBill: An Internet Commerce System Optimized for Network Delivered Services, IEEE Personal Comm., pp. 34-39 (Aug. 1995).

Mary C. Lacity et al, The Information Systems Outsourcing Bandwagon, 35 Sloan Mgmt. Rev. 73 (1993).

Method of Protecting Data on a Personal Computer, IBM Technical Disclosure Bulletin 26:6, p. 2530 (Nov. 1985).

Muse Technologies, Inc., http://www.musetechnologies.com (last visited Apr. 26, 1999).

(56) References Cited

OTHER PUBLICATIONS

Nelson E. Hastings et al, A Case Study of Authenticated and Secure File Transfer: The Iowa Campaign Finance Reporting System (ICFRS), Performance, Computing and Comm. Conf., pp. 532-538 (Feb. 1997).
Object Management Group, CORBA for Beginners, http://www.omg.org (last visited May 25, 1999).
Object Management Group, CORBA Overview, http://pent21.infosys.tuwein.ac.at (last visited May 25, 1999).
Object Management Group, Library, http://www.omg.org (last visited May 25, 1999).
Object Management Group, What is CORBA?, http://www.omg.org (last visited May 25, 1999).
Omware, Inc., http://web.archive.org/web/20000226033405/www.omware.com/products.html (last visited Nov. 28, 2005).
Paul Seibert, Facilities Planning & Design for Financial Institutions 15, 272, 274-77 (1996).
Myers, Ankeney, Malpani, Galperin, and Adams, X.509 Internet Public Key Infrastructure Online: Certificate Status Protocol-OCSP, Entrust Technologies, Jun. 1999, pp. 1-8.
Philip Carden, The New Face of Single Sign-On, Network Computing (Mar. 22, 1999), http://www.networkcomputing.com/1006/1006f1.html.
Primavera Systems Delivers Expedition Express, Bus. Wire, Feb. 23, 1999.
Primavera Systems, Inc., Expedition Contract Control Software Version 6.0 User's Guide (1998).
Primavera Systems, Inc., http://www.primavera.com (1999).
Primavera Systems, Inc., Primavera and PurchasePro.com to Create E-Commerce Marketplace for Construction Industry, Sep. 21, 1999, available at http://web.archive.org/web/2000412175935/http://www.purchasepro.com (last visited Jun. 23, 2005).
Product Data Integration Technologies, Inc., http://www.pdit.com (last visited Apr. 26, 1999).
Richard Mitchell, Netlink Goes After an Unbanked Niche, Card Tech., Sep. 1999, at 22.
Robert Barnham, Network brings together producers and companies, Feb. 1, 1994, at 80.
Roberta Fusaro, Builders moving to Web tools, ComputerWorld, Nov. 16, 1998, at 51.
Robyn Meredith, Internet bank moves closer to virtual reality, USA Today, May 5, 1995, at B1.
Safe Single-Sign-On Protocol with Minimal Password Exposure No-Decryption, and Technology-Adaptivity, IBM Technical Disclosure Bulleting 38:3, pp. 245-248 (Mar. 1995).
Server/Applet/HTML Authentication Process with Single Sign-On, IBM Research Disclosure 429128, pp. 163-165 (Jan. 2000).
Shimon-Craig Van Collie, Construction Loan Tool from PriMerit, New Trend, Bank Mgmt., Apr. 1990, at 60.
Siebel Systems, Inc., http://www.siebel.com (last visited Nov. 17, 1999).
SmartAxis bv, http://www.smartaxis.co.uk/seller/howitworks.html (last visited Feb. 23, 2001).
Steven Marlin, Chasing document management, Inform, pp. 76-82 (Apr. 1999).
Stuart J. Johnston, Pondering Passport: Do you trust microsoft with you data?, PC World, Sep. 24, 2001.
Sun Microsystems, Applets, http://java.sun.com (last visited May 21, 1999).
Sun Microsystems, JAVA Remote Method Invocation Interface, http://java.sun.com (last visited May 21, 1999).
Sun Microsystems, JAVA Servlet API, http://java.sun.com (last visited May 21, 1999).
Sun Microsystems, JAVA Technology in the Real World, http://java.sun.com (last visited May 21, 1999).
Sun Microsystems, JNDI Overview, http://java.sun.com (last visited May 21, 1999).
Sun Microsystems, Staying in Touch with JNDI, http://java.sun.com (last visited May 21, 1999).
Sun Microsystems, The JDBC Data Access API, http://java.sun.com (last visited May 21, 1999).
Temporary Global Passwords, IBM Technical Disclosure Bulletin 26:3, pp. 451-453 (Mar. 1993).
The check is in the E-mail, Info. Today, Mar. 1, 1995, at 43.
ThomasNet, Inc., http://www.thomasnet.com (last visited Apr. 26, 1999).
ThomasNet, Inc., SoluSource for Engineers by Engineers, http://www.solusource.com (last visited Apr. 26, 1999).
Timothy M. Chester, Cross-Platform Integration with XML and SOAP, IP Pro, pp. 26-34 (Sep./Oct. 2001).
Tom Jepsen, SOAP Cleans up Interoperability Problems on the Web, IT Pro, pp. 52-55 (Jan./Feb. 2001).
Tomas Hernandez Jr., Software Solutions, Building Design & Construction, Nov. 1999, at 38.
U.S. Small Business Administration, PRO-Net, www.sba.gov (last visited Jun. 8, 1999).
V. Ryan et al, Internet Engineering Task Force, Schema for Representing CORBA Objects in an LDAP Directory (work in progress), http://tools.ietf.org/html/draft-ryan-corba-schema-00 (Apr. 15, 1999).
Vanessa Houlder, OFT gives the individual top priority, Fin. Times, Jun. 8, 1994.
VISA International, Consortium Created to Manage Common Electronic Purse Specifications, http://www.visa.com/av/news/PRmisc051199.vhtml (last visited Feb. 23, 2001).
W. Richard Mosig Jr., Software Review: The Construction Project Manager, Cost Engineering, Jan. 1996, at 7.
Wingspan Bank, At Your Request, http://www.wingspanbank.com (last visited Aug. 10, 1999).

\* cited by examiner

| Certificates I Request | | | | | |
|---|---|---|---|---|---|
| | | Submitted | | | |
| Date Created | Business Request ID | Type [All] | Primary LOB | Application Name | Status |
| Mon Jun 25 13:55:10 GMT | 2007062513550988 | New | TSS-CB | dfsgsg | Initiated Business Request Approved |
| Mon Jun 25 13:50:08 GMT | 2007062513500987 | New | TSS-CB | cdhdfhf | Initiated Business Request Approved |
| Mon Jun 25 13:40:43 GMT | 2007062513400986 | New | IB | AFSXpress Syndications (Automated Financials Sys) | Initiated Business Request Approved |
| Mon Jun 25 13:35:12 GMT | 2007062513350985 | New | IB | ACH Deposit Concentration Services | Initiated Business Request Approved |
| Mon Jun 25 13:12:29 GMT | 2007062513120984 | Replace | IB | DART | Initiated Business Request Approved |
| | | | | | [ View All ] |

SYSTEMS AND METHODS FOR MANAGING DIGITAL CERTIFICATES

CROSS-REFERENCE TO RELATED APPLICATIONS

This is a continuation application of U.S. patent application Ser. No. 12/122,944, filed May 19, 2008, which in turn claims the benefit of U.S. Provisional Patent Application No. 60/938,575, filed May 17, 2007. The entire disclosures of U.S. patent application Ser. No. 12/122,944 and U.S. Provisional Patent Application No. 60/938,575 are hereby incorporated by reference herein.

FIELD OF THE INVENTION

Embodiments of the invention relate generally to digital security, and, more particularly, to systems and methods for managing digital certificates.

BACKGROUND OF THE INVENTION

In today's business environment, many systems employ communications over digital networks such as company intranets and the Internet. When these systems are used, the security of communications between parties is always a concern. To establish secure communications, a secure channel can be established, through which data can be securely passed.

A digital certificate can be used to establish a secure communication channel. A digital certificate (or identity certificate) is an electronic document which incorporates a digital signature to bind together a public key with an identity (i.e., information such as the name of a person or an organization, or an address). The certificate can be used to verify that a public key belongs to an individual or organization.

A certificate typically includes the public key being signed, a name, which can refer to a person, a computer or an organization, a validity period, the location (universal resource locator) (URL) of a revocation center and the digital signature of the certificate, produced by a certificate authority's private key.

The certificate authority or certification authority is an entity which issues digital certificates for use by other parties. It is an example of a trusted third party. A certificate authority issues digital certificates which contain public key and private key pairs. The certificate authority also attests that the public key contained in the certificate belongs to the person, organization, server or other entity noted in the certificate. A certificate authority's obligation in such schemes is to verify an applicant's credentials, so that users and relying parties can trust the information in the certificate authority's certificates. Examples of certificate authorities include organizations such as VeriSign, Comodo and Entrust.

Large organizations can find themselves managing tens of thousands of digital certificates every year. Each of these digital certificates has a lifecycle that includes a request for the certificate, authorization to use the certificate, management and use of the certificate, expiration of the certificate, and the request of a replacement certificate. Management of the lifecycles is further complicated by the fact that certificates typically expire a year after they are issued, with the issuance of certificates occurring on a continuous rolling basis. Managing tens of thousands of certificates that are expiring on a rolling basis is an arduous and complex task.

A typical problem that occurs with such certificate management includes the difficulty of manually managing the certificates. This is because requests for certificates, related authorizations and distribution of the certificates are typically accomplished via a series of e-mail exchanges that are performed in an ad hoc manner. Such management of certificates can lead to a lack of accountability and a lack of appropriate escalation when the intended recipient of a certificate does not respond to an e-mail communication.

Thus, there is a need for an improved system and method for managing digital certificates within an organization.

SUMMARY OF THE INVENTION

Embodiments of the invention satisfy this and other needs by providing improved systems and methods for managing digital certificates.

Embodiments of the invention provide for methods and systems that manage the lifecycle of certificates. The methods and systems can provide one or more functionalities such as automating the certificate lifecycle management system, avoiding negative impact on clients due to expiring certificates, improving accountability and escalation, aligning with line of business (LOB) operational models, providing greater transparency to LOBs via self-administration and accommodating un-managed certificates (i.e., self-signed) in the firm.

A method of managing a digital certificate by a computer system can include the steps of receiving, the at the computer system, a business request for a digital certificate from a requester and transmitting, by the computer system, the request to a first approver. The method can further include, upon approval by the first approver, transmitting, by the computer system, the request to a second approver, upon approval by the second approver, transmitting, by the computer system, the request to a certificate manager, transmitting, by the computer system, the request to an implementer and receiving, by the computer system, from the implementer, technical information related to the request and transmitting, by the computer system, a certificate to a certificate supplier.

Thus, by way of embodiments of the invention, a large organization can efficiently manage the life cycle of digital certificates.

BRIEF DESCRIPTION OF THE DRAWINGS

Objects and advantages of the invention will become apparent upon consideration of the following detailed description, taken in conjunction with the accompanying drawings, in which like reference characters refer to like parts throughout, and in which:

FIG. 6 is an exemplary screenshot of a certificate request page of a certificate management system, in accordance with certain embodiments of the invention;

FIG. 9 is an exemplary screenshot of a create new request page of a certificate management system, in accordance with certain embodiments of the invention.

It is to be understood that the above-mentioned drawing figures are provided solely to assist in describing the concepts of embodiments of the present invention.

DETAILED DESCRIPTION

Figure 1:
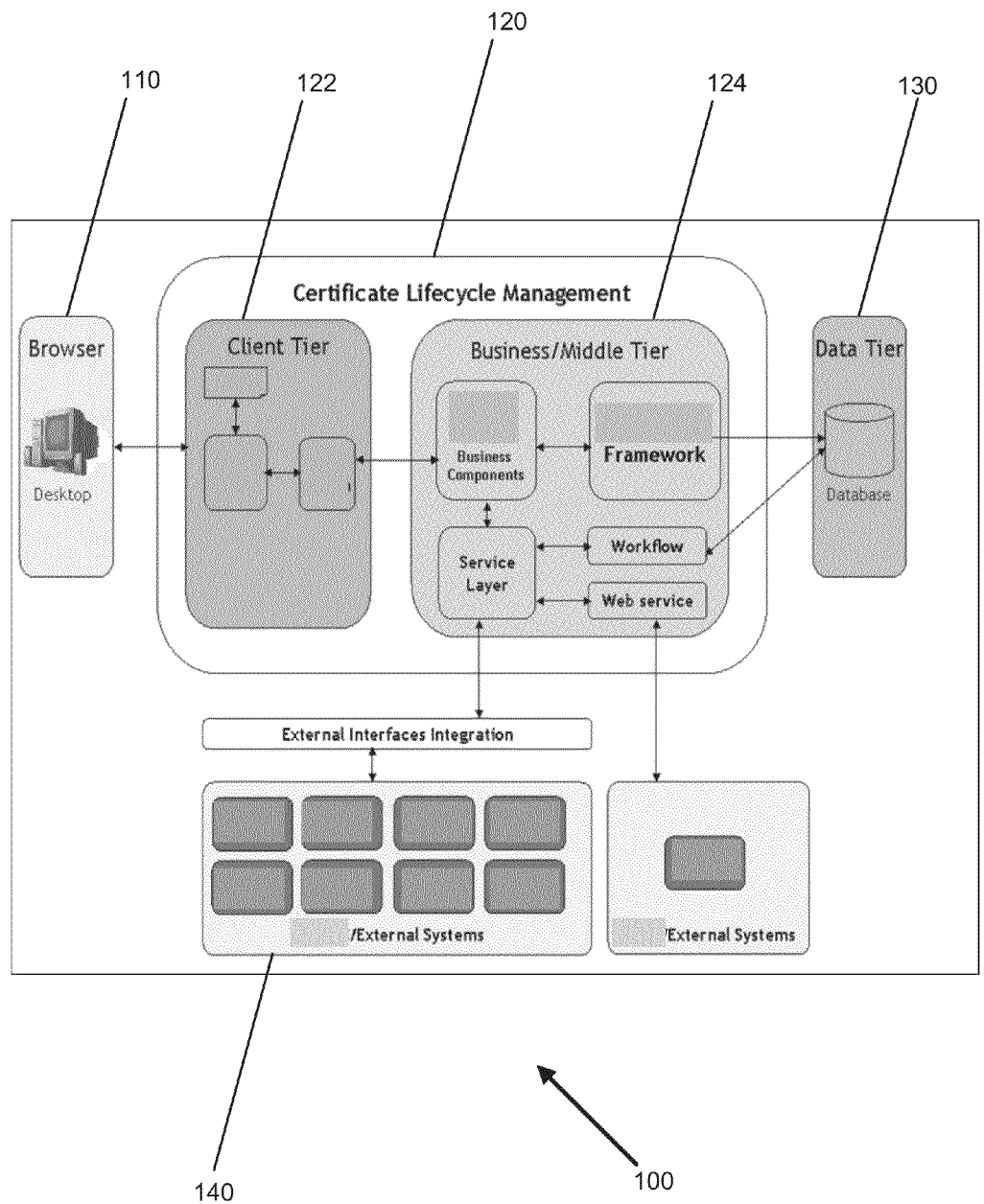
FIG. 1 is a high level block diagram of a certificate management system, in accordance with certain embodiments of the invention.

With reference to FIG. 1, there is shown a high level logical block diagram of a certificate management system 100 in accordance with certain embodiments.

A user of the system 100 can access the system via a user workstation 110. Workstation 110 can be a personal or other computer, communicatively coupled to a network such as an intranet or the Internet. The user accesses the system via a Web browser at workstation 110. In one embodiment, the application is intranet-based with access by a user through a Web browser, with no other special tools or software required.

Workstation 110 allows a user to access, and communicate with, certificate lifecycle management module 120. The lifestyle management module 120 comprises two sub-modules or tiers, a client tier 122, and a business/middle tier 124. Client tier 122 presents information (e.g., user entry forms, data) to the users providing a common look and feel across the system 100. In one embodiment, the technology at this tier includes standard technologies (e.g., the HTML JavaScript programming languages). The client tier 124 is responsible for rendering user display and input pages and performing client side validations while offloading the complex business rules and database queries to the business/middle tier 124. In this embodiment, the client tier 122 interacts with the business/middle tier 124 using the industry standard Struts framework.

The business/middle tier 124 enforces all of the business logic employed by system 100, including, for example, workflow, form/data validations and processing. In one embodiment, business/middle tier 124 utilizes industry standard technologies for applications (e.g., Java and the Spring Framework programming systems). The business/middle tier 124 acts as the bond between the data tier 130 and the client tier 122. The business/middle tier 124 performs functions such as pooling, transaction support, as well as other functions. The business/middle tier 124 receives data requests from the client tier 122, processes the data, and responds back to the client tier 122. To satisfy a request from the client tier 122, the business/middle tier 124 communicates with the data tier 130.

In one embodiment, client tier 122 and business/middle tier 124 can reside on the same server. In other embodiments, each tier can reside on a different server.

Business/middle tier 124 can be communicatively coupled to data tier 130. Data tier 130 provides the storage medium for any data that is retained by system 100. In some embodiments, data tier 130 can include one or more databases stored at one or more servers. The database can use database technology, such as systems provided by Oracle. An industry standard communication framework, such as that provided by iBatis, can provide communication between the business/middle tier 124 and data tier 130. Data stored at data tier 130 can include user information, business organizational hierarchy information, certificate information, certificate status, creation and termination dates, as well as other system information.

The business/middle tier 124 interfaces and integrates with external systems 140. External systems 140 can include certificate services providers (e.g., VeriSign VICE). Services and/or data (e.g., internal reference data, authentication/authorization rights, and mail services) can be shared with external systems 140. Examples of data that is shared with external systems 140 can include User standard identification (SID), e-mail messages, line of business information, job title information, as well as other relevant data. The sharing of data with external systems can require authorization information, such as a VeriSign authorization and related password information.

Figure 2:
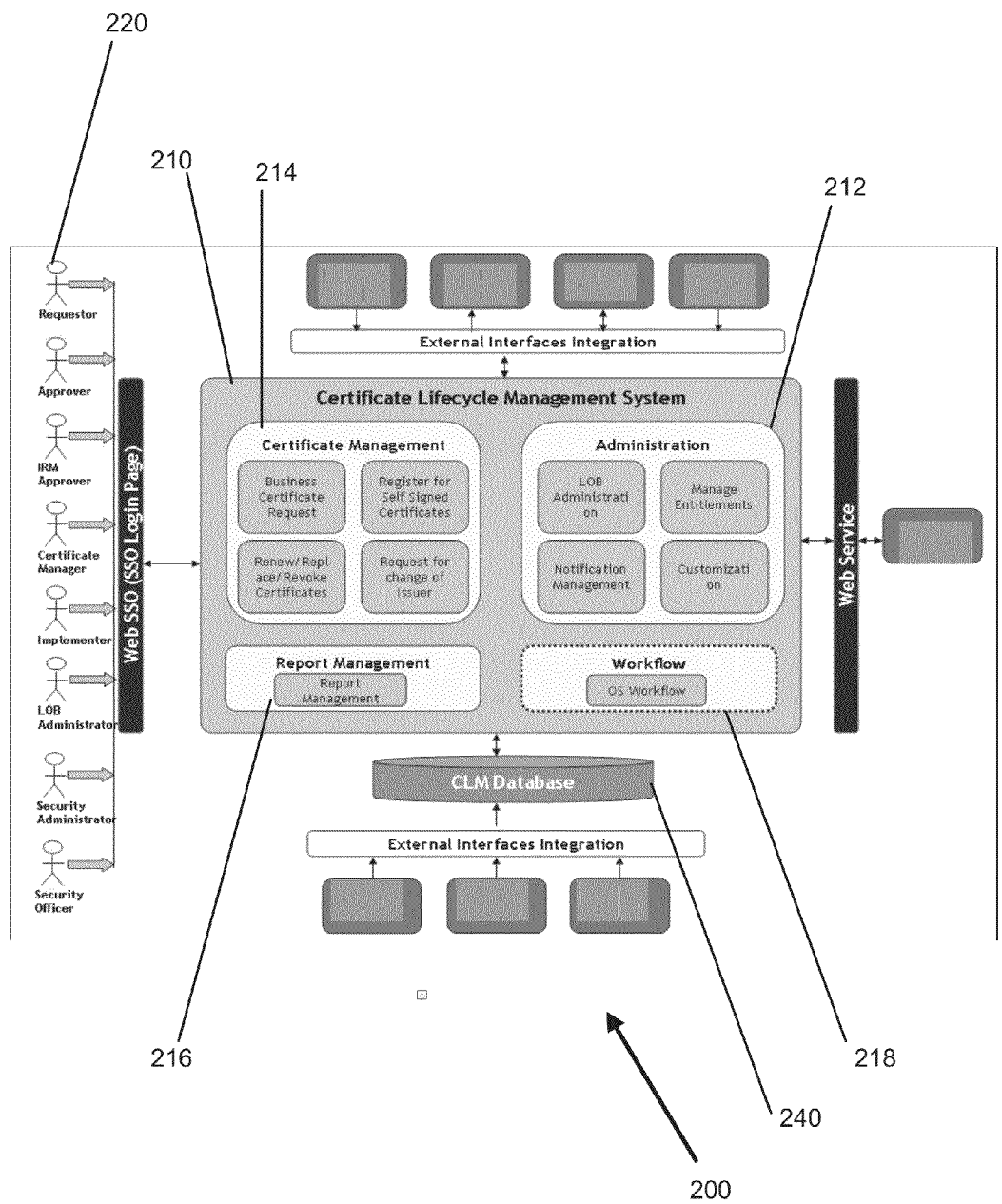
FIG. 2 is a high level block diagram showing the flow of information through a certificate management system, in accordance with certain embodiments of the invention.

With reference to FIG. 2, there is shown a certificate management system application work flow 200.

A user 220, using a Web browser, can access certificate lifecycle management system 210. When accessing system 210, a user can access any one of three main modules: certificate lifecycle management module 214; reporting module 216; and administration module 212.

Certificate lifecycle management module 214 provides a facility for businesses or business units to request, renew, replace and revoke certificates. Reporting module 216 provides aggregated and detailed information about a certificate lifecycle to users. In one embodiment, reporting is accomplished via Java reports built within system 200. Data is stored at an Oracle database. Administration module 212 provides configuration management for components of the application (e.g., general user and certificate information, line of business specific information, user entitlements, notifications, workflow, as well as other components). In some embodiments, notifications (e.g., via email or other communication channels) can be sent to appropriate parties to alert the parties of impending deadlines, such as the expiration of a certificate, or a delay in the certificate requesting process. The alerts can be issued at predetermined times, such as, for example, at 90 days before the expiration of a certificate. As discussed in further detail below, if appropriate action is not taken, an escalation process can cause alerts to be sent to additional parties at predetermined times, such as, for example, five day prior to expiration of a certificate, to facilitate resolution of the process.

Figure 3:
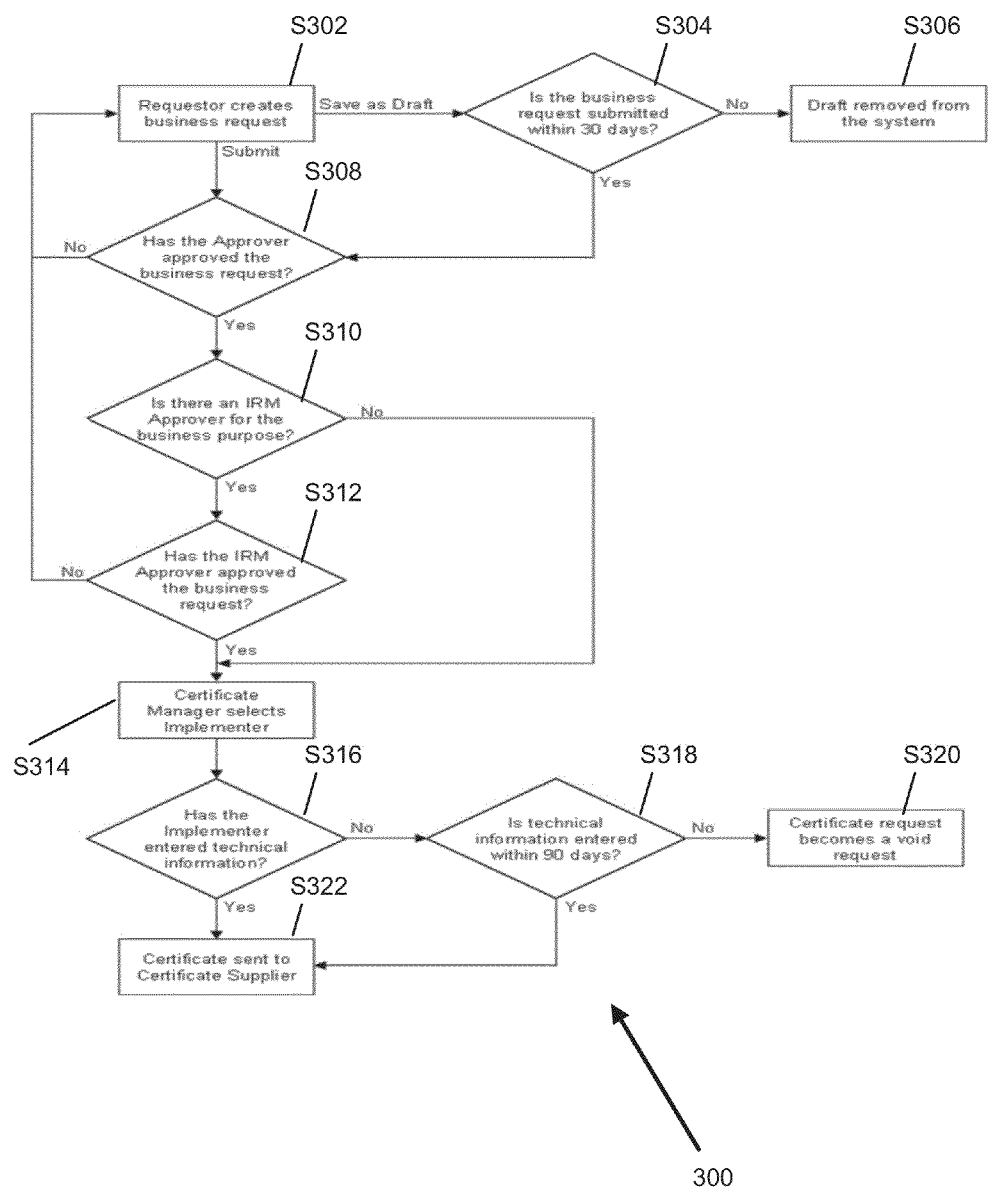
FIG. 3 is a flow diagram illustrating a process of certificate creation, in accordance with certain embodiments of the invention.
Figure 4:
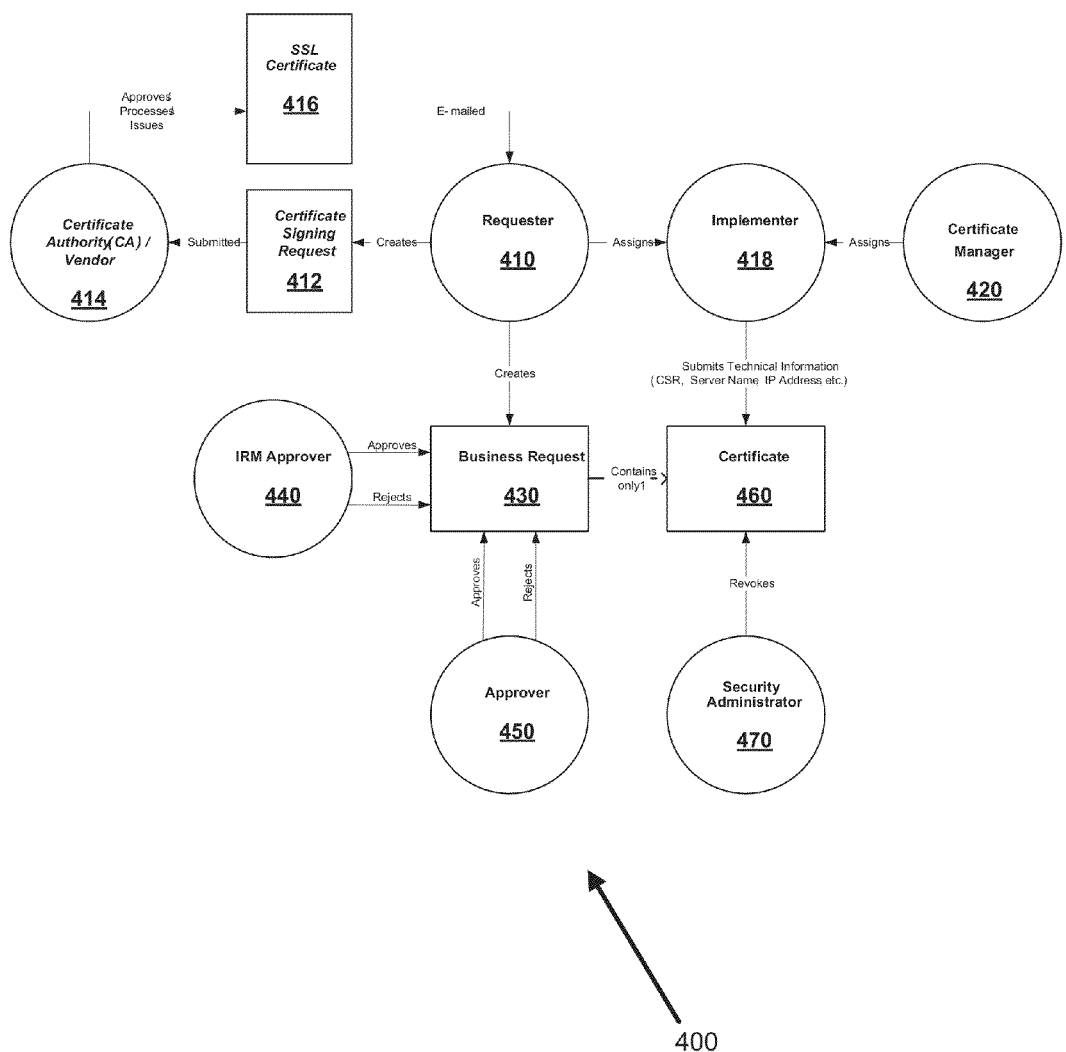
FIG. 4 is a system diagram showing an information flow between entities, in accordance with certain embodiments of the invention.

With reference to FIGS. 3 and 4, an exemplary certificate creation flow 300, by way of entities 400, in accordance with some embodiments, is illustrated. First, a requestor (410) creates a business request (430). Step S302. As used herein, a requestor is any authenticated user who requests and/or owns a certificate at a given instance. The business request (430) is then saved as a draft. Step S304. As used herein, a draft is a business request that is saved but not submitted. This business request may have fields that are not yet filled. The user can enter the available information and then save the business request as a draft to fill it at a later time. A business request can be saved as a draft for a maximum of some predetermined number of days (e.g., 30 days) after which it is removed from the certificate management system. If the draft remains on the system for more than a predetermined amount of time (e.g., more than thirty days), the draft request is deleted from the system. Step S306.

If the requestor (410) submits the request (430) to an approver (450), and the approver (450) does not approve the request (430) (step S308), then, the request (430) is returned to the requestor (410), returning to step S302. As used herein, an approver is an information owner or an alternate authority who is accountable for the verification, validation, and authorization of the requestor's business request, based on the business need.

If, however, the approver (450) approves the request (430) (step S308), the request (430) is passed on along the process, to step S310.

At step S310, if the related business purpose has an information risk manager (IRM) approver (440), then the request (430) is passed to the IRM approver (440) at step S312. As used herein, an Information Risk Manager (IRM) is a person assigned to review the potential risk impact of a particular certificate request prior to the fulfillment of the request. The information risk manager is responsible for coordinating all business compliance requirements in accordance with the company's information technology (IT) risk management policies and standards to ensure compliance. In some embodiments, the use of an IRM approver is optional. If the IRM approver (440) does not approve the request (430) at step S312, then the request (430) is returned to the requestor (410) at step S302. If the IRM approver (440) approves the request (430) at step S312, the request (430) is passed along to a certificate manager (420) at step S314. As used herein, a certificate manager is a person who can assign implementers and monitor certificate lifecycle events for his specific line of business (LOB), or certificate type.

Also, if there was no IRM approver (440) for the related business purpose (at step S310), then the request (430) is passed directly to the certificate manager (420) (at step S314), without passing through an IRM approver (440).

Then, at step S314, the certificate manager (420) selects an implementer and the request is passed to the implementer at step S316. As used herein, an implementer is a person responsible for generating the key, CSR (i.e., a file that contains the certificate details such as the distinguished name), and updating the certificate request details with technical metadata.

If the implementer has entered technical information (step S316), then a certificate (460) is sent to a certificate supplier. Step S322. As used herein, technical information (or deployment information) includes information such as CSR, server name and IP address, deployment configuration, and environment that is entered by the implementer for each certificate. As used herein, a certificate supplier is a certificate vendor, as described above.

If the implementer has not entered technical information (step S316), then the request remains in a queue for a predetermined period of time (e.g., 90 days). Step S318. If the technical information is entered during the predetermined period (step S318), then a certificate (460) is sent to the certificate supplier. Step S322. If, on the other hand, technical information is not entered during the predetermined period (step S318), the request (430) becomes a void request. Step S320.

The security administrator 470 is the administrator of the system facilitating the certificate lifecycle management functions.

In some embodiments, the system can include an escalation coordinator, a person responsible for maintaining the escalation profile/attributes of various certificates. Contact information, such as e-mail addresses, for requestors 410, approvers, 450, implementers 418, as well as an escalation coordinator can be stored by the system. If the system determines that action by a party is needed, such as, for example, renewal of a certificate, or response to a certificate request, the system can alert, for example, via e-mail or other communications, the responsible party. If the responsible party does not respond within a predetermined amount of time, another party, such as the escalation coordinator, can be alerted, to facilitate smooth operation of the certificate management process.

When a certificate is issued, it is expected to be in use for its entire validity period. However, various circumstances may cause a certificate to become invalid prior to the expiration of the validity period, thus causing the certificate to be revoked. Certificates can be revoked for several reasons, as are known to those of skill in the art. An example of a reason for certificate revocation is that a certificate is no longer being used by a business unit, because a corresponding Web site has been decommissioned. In addition, a certificate can be revoked because the certificate has become corrupted, or requested incorrectly with incomplete or incorrect request information.

In some embodiments, a security administrator 470 can be alerted by the system about circumstances warranting revocation of a certificate. The security administrator can then take certain steps to revoke the certificate.

When a request for a certificate has been approved, a certificate can be issued from a certificate authority 414.

In some embodiments, actions taken during the certificate management process can be time stamped with the date and time the actions are performed.

With reference again to FIGS. 1 and 2, in some embodiments, external systems 140 of system 100 can include an automated provisioning module. Upon approval of a certificate, the provisioning module can facilitate the automatic insertion of a certificate on the appropriate computer system, without the need for human interaction. The provisioning module can include one or more software modules located at servers of the certificate management system 100. In some embodiments, the provisioning module obtains certificate information stored at data tier 130 about a requested certificate, and correlates the certificate information with an appropriate receiving server or other computer, to insure that the correct certificate is being installed on the appropriate system. In some embodiments, the provisioning module can be used to automatically de-provision or remove a certificate from a server or computer, if the certificate is revoked or it is otherwise determined that the certificate is to be removed. In some embodiments, the provisioning module can deliver a certificate to an agent module, which then performs the local installation of a certificate.

In some embodiments, external systems 140 of system 100 can include a discovery module. The discovery module can include one or more software modules configured to probe servers and other computers used within the business environment of a company, business unit, institutional clients and/or internal clients. The discovery module can probe servers and/or computers of the client and detect certificates on the computers. The discovery module can then compare information about detected certificates with information about the status of known certificates stored at the data tier 130. By way of such detection and comparison, the discovery module can automatically determine, for example, if certificates exist that are not in the inventory stored at data tier 130, or if one or more certificates have a different status (e.g., revoked) than is indicated in the inventory information at data tier 130.

In some embodiments, system 100 can keep track of the relative priority of different certificates, and include the certificate priority information in communications and alerts described above. In addition, certain operational parameters, such as predetermined times for transmitting communications and alerts, as well as predetermined times and circumstances to trigger escalation of communications can be based, at least in part, on the relative priority of a certificate, with the processing of higher priority certificates generally involving more frequent communications, and more aggressive escalation and alerting communications.

As described above, users employ the certificate management system by accessing and interfacing with various user interface screens via a Web browser. Certain exemplary user interface screens are discussed below.

Figure 5:
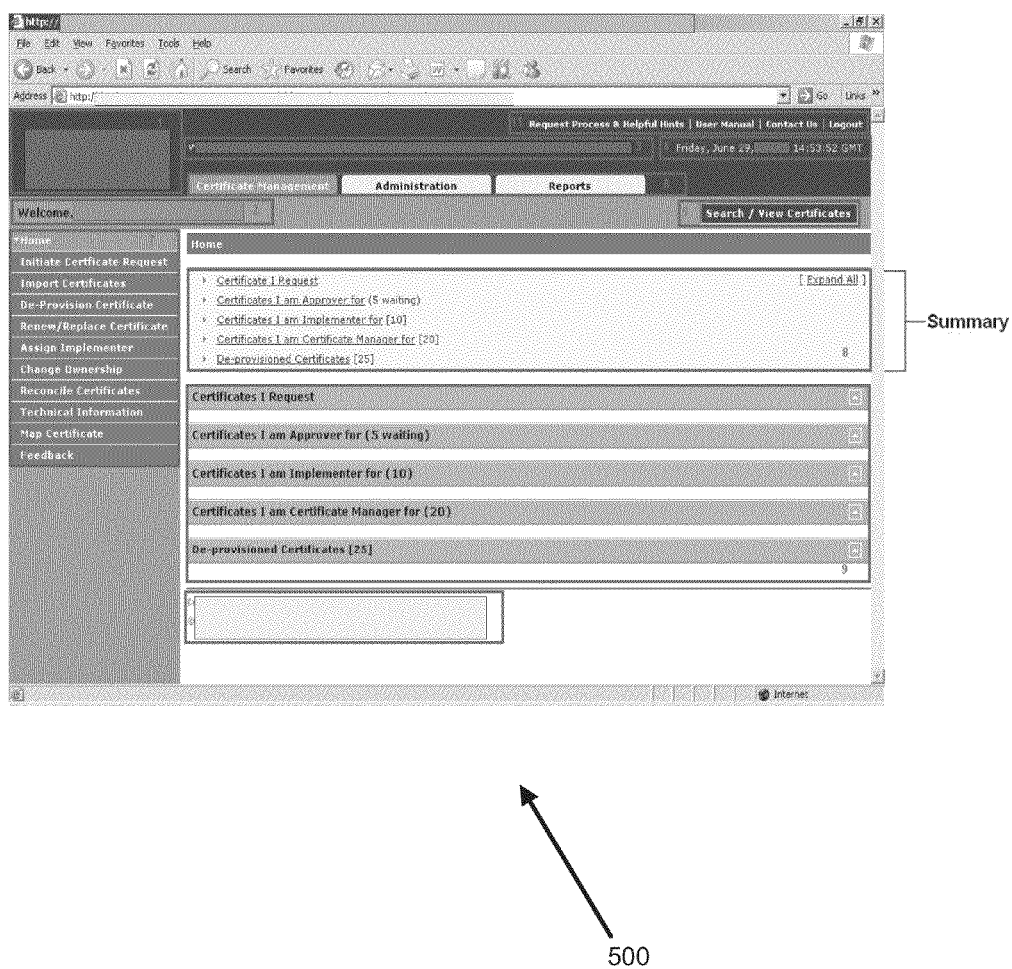
FIG. 5 is an exemplary screenshot of a home page of a certificate management system, in accordance with certain embodiments of the invention.

With reference to FIG. 5, in certain embodiments, the home page 500 is the first page that appears after a user is authenticated by the system. Options that appear on this page are based on the role and permissions of the user. One or more of the following information fields can appear on the home page: user name; broadcast message; current date and time. From this screen, a user can to search for specific certificates and view their details. A user can search for certificates based on criteria such as business requestor standard identification (SID), and application name.

The left navigation pane can contain links that allow a user to navigate to various pages within a module. The links that appear on this pane depend on the role and permissions of the user. The summary section contains links and the number of certificates or business requests in different category sections, including the following: Certificates I Request, Certificates I am Approver for, Certificates I am Implementer for, Certificates I am Certificate Manager for, and Certificates I have de-provisioned. These sections contain details on business requests or certificates. Selecting the appropriate section bar allows a user to view more details, as follows.

Certificates I Request: selecting this link opens the Certificates I Request section. The Certificates I Request section contains the Submitted, Draft, and Need to Assign Implementer sub-sections.

Certificates I am Approver for: selecting this link opens the Certificates I am Approver for section. The Certificates I am Approver for section contains the Waiting for My Approval, On Hold, Approved, and Rejected sub-sections.

Certificates I am Implementer for: selecting this link opens the Certificates I am Implementer for section. The Certificates I am Implementer for section contains the Implemented and Waiting for MY Implementation sub-sections.

Certificates I am Certificate Manager for: selecting this link opens the Certificates I am Certificate Manager for section. The Certificates I am Certificate Manager for section contains the Submitted and Need to Assign Implementer sub-sections. This section appears only for a Certificate Manager and a Security Administrator.

Certificates I have de-provisioned: selecting this link opens the Certificates I have de-provisioned section.

With reference to FIG. 6, a Certificates Request screen 600 is shown. The Certificates I Request section contains the certificates that a user has requested. This section contains three sub-sections: Submitted, Draft, and Need to Assign Implementer.

Figure 7:
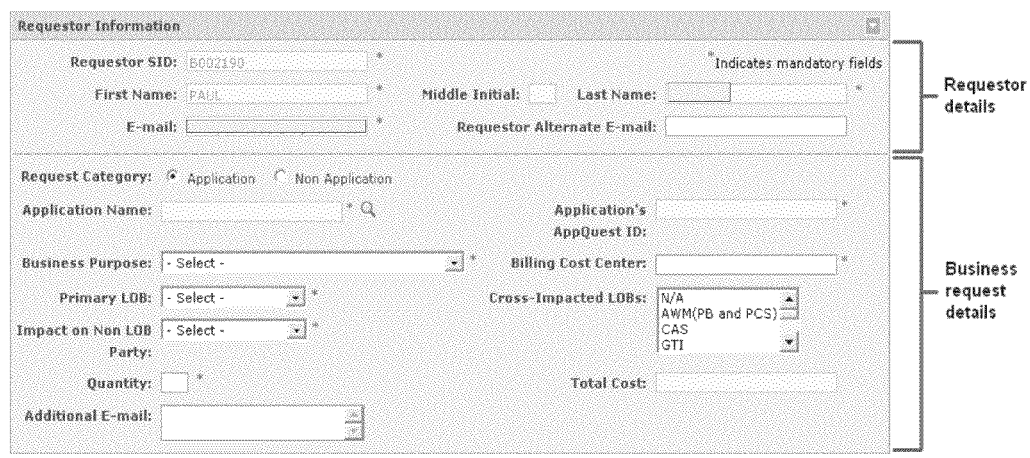
FIG. 7 is an exemplary screenshot of a requestor information page of a certificate management system, in accordance with certain embodiments of the invention.

FIG. 7 shows a requestor information screen 700. The requestor information screen can include one or more of the following sections: Requestor's Information; Application Information; LOB Information; Certificate Request Information; Approver Information; IRM Approver Information; Authorized Contact Information; Deployment Information; and Requestor's Information The Requestor's Information section contains details of the requestor.

The Application Information section contains details of the application. The Application Information section contains two options: App Quest Application and Non App Quest Application. To select the application name, a user selects the Click here to Select Application link.

Figure 8:
FIG. 8 is an exemplary screenshot of a deployment information page of a certificate management system, in accordance with certain embodiments of the invention.

With reference to FIG. 8, there is shown a Deployment Information screen 800. The Security Administrator or LOB Administrator specifies whether it is mandatory, optional, or not required for a user to enter deployment information when creating the request. If it is mandatory to enter the deployment information, then a business request cannot be submitted unless the deployment information for all certificates is completed.

In some embodiments, a user can fill deployment information for certificates only after a user selects the business purpose in the Business Purpose list box. To fill the deployment information for each certificate, select the Add Technical Info check box and then click Add. If a user click Add without selecting the business purpose in the Business Purpose list box, an error message appears.

Figure 9:
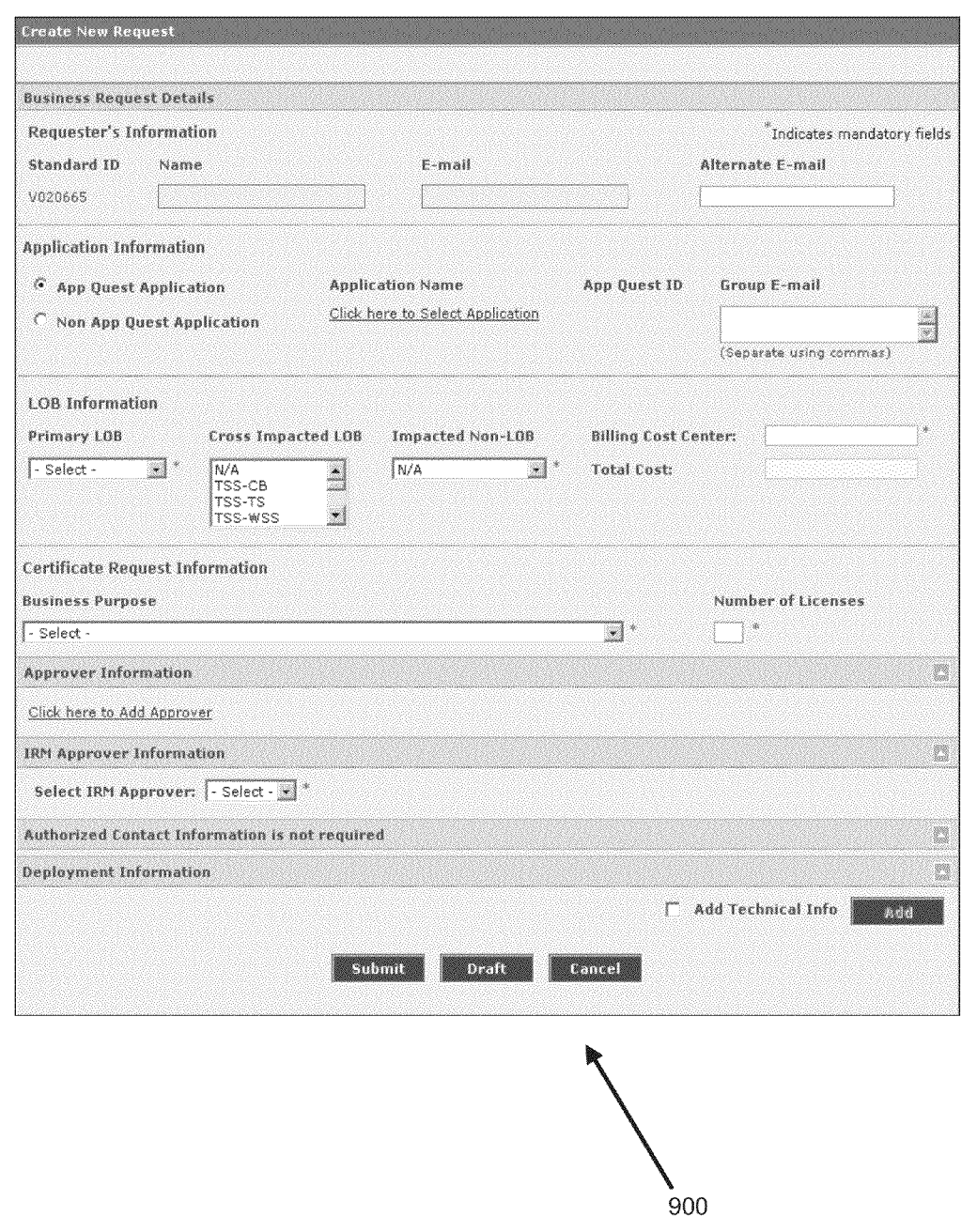

A Create a Business Request for Certificates screen 900 is shown in FIG. 9. Any authenticated user can submit a request for certificates. To create a business request for one or more certificates, on the Certificate Management tab, a user selects the Initiate Certificate Request link on the left navigation pane. The Create New Request page can include one or more of the following sections: Requestor's Information; Application Information; LOB Information; Certificate Request Information; Approver Information; IRM Approver Information; Authorized Contact Information; Deployment Information; and Requestor's Information.

The Requestor's Information section contains details of the Requestor. Some of the mandatory fields are system-populated and read-only.

The Application Information section contains details of the application. The Application Information section contains two options: App Quest Application and Non App Quest Application. The App Quest Application option is selected by default. To select the application name: Click the Click here to Select Application link.

The Total Cost box shows the total cost for the requested licenses. The Certificate Request Information section contains details of the certificate request. The Approver Information section contains details of the Approver.

The IRM Approver Information section contains details of the IRM Approver. If the selected business purpose does not require an IRM Approver's approval, then the IRM Approver Information section bar is disabled. The name of section changes to IRM Approver Information is not required and the section is hidden.

The Security Administrator or LOB Administrator specifies whether it is mandatory, optional, or not required for a user to enter deployment information when creating the request. To save the business request as a draft before adding technical information, click OK.

Figure 10:
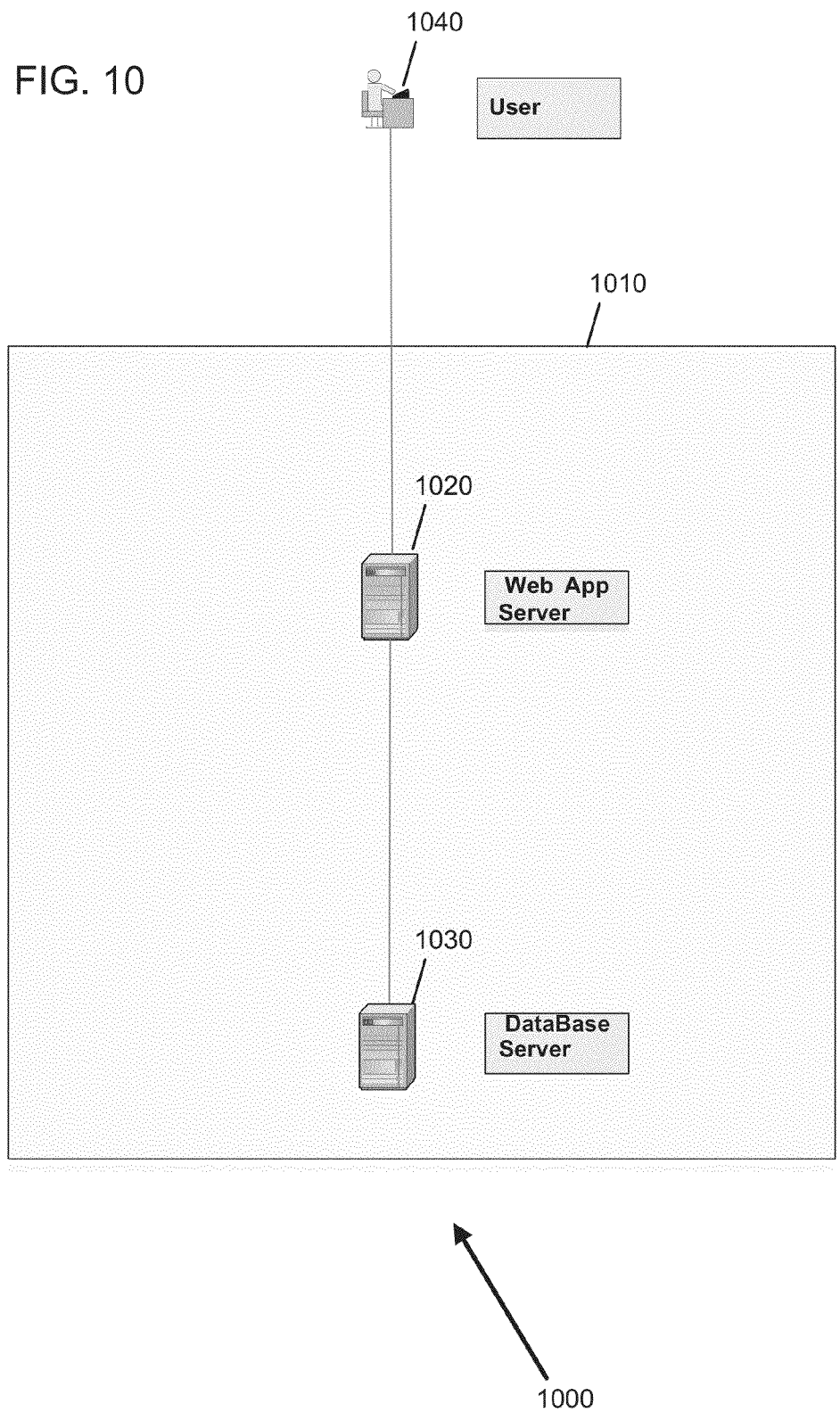
FIG. 10 is a schematic diagram of an exemplary hardware implementation of a certificate management system, in accordance with certain embodiments of the invention.

With reference to FIG. 10, there is shown an exemplary hardware implementation 1000 of certain embodiments, as described above. A user accesses the certificate management system from a user computer 1040 such as a desktop computer, laptop computer, notebook computer, or handheld device. The user computer 1040 is communicatively coupled to an application server 1020 running software to execute the certificate management system 1000. The communicative coupling can be via a network connection such as the Internet, an intranet, and/or a wireless communication channel. The application server 1020 is likewise communicatively coupled to database server 1030, which runs database management software and facilitates the transfer of data from and to one or more databases. Embodiments of the certificate management system 1000 can be implemented with more or less servers and/or user computers, in similar or different configurations, as would be known to one or skill in the art, as informed by the present disclosure.

In certain embodiments of the invention, all of the steps of the method can be performed by a computer, or computerized system, as described above. In alternative embodiments, one or more of the steps can be performed manually, by a person.

In alternate embodiments of the methods described herein, additional steps may be added, certain steps may be excluded, certain steps may be performed multiple times, and/or the steps may be performed in a different order and/or simultaneously.

While certain systems and methods have been described herein relative to the tracking and management of digital certificates, the systems and methods can also be used to manage, track, install and/or un-install other types of electronic documents or information, such as, for example, digital keys, password management information, secure shell (SSH) protocol communication information, as well as others, as would be known to one of skill in the art, as informed by the present disclosure.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A method comprising:
    receiving, by a computer system, a request for a digital certificate from a requester within an organization;
    providing, by the computer system, the request to an approver within the organization;
    receiving, by the computer system from the approver, an approval of the request;
    providing, by the computer system, an approved request to an implementer within the organization;
    receiving, by the computer system, from the implementer, technical information related to the approved request for generating a digital certificate based on the technical information;
    determining, by the computer system, a computer on which the digital certificate is to be installed;
    providing, by the computer system, an alert to the approver at a first time before an expiration date of the digital certificate; and
    determining, by the computer system, if the approver has responded to the alert by a second time before the expiration date, and, if the approver has not responded, providing, by the computer system, an alert to another party.

2. The method of claim 1, further comprising the step of storing certificate information related to the digital certificate in a database.

3. The method of claim 2, wherein the certificate information comprises the expiration date of the certificate.

4. The method of claim 1, further comprising installing the digital certificate on the computer.

5. The method of claim 1, further comprising:
    transmitting the certificate to an agent; and
    installing, by the agent, the certificate on the computer.

6. The method of claim 2, further comprising:
    probing, by the computer system, a plurality of computers to identify previously installed certificates;
    retrieving, by the computer system, information about the previously installed certificates; and
    comparing, by the computer system, the information about the previously installed certificates to the stored certificate information to determine if any installed certificates comprise information different from the stored certificate information.

7. The method of claim 6, further comprising transmitting, by the computer system, an alert regarding any installed certificates that comprise information different from the stored certificate information.

8. A method comprising:
    receiving, by a computer system, a business request for a digital certificate from a requester;
    providing, by the computer system, the request to a first approver;
    upon approval by the first approver, transmitting, by the computer system, the request to a second approver;
    upon approval by the second approver, transmitting, by the computer system, the request to an implementer;
    receiving, by the computer system, from the implementer, technical information related to the business request for generating a digital certificate based on the technical information;
    determining, by the computer system, a computer on which the digital certificate is to be installed;
    providing, by the computer system, a first alert to the first approver at a first time before an expiration date of the digital certificate; and
    determining, by the computer system, if the first approver has responded to the alert by a second time before the expiration date, and, if the first approver has not responded, providing, by the computer system, an alert to the second approver.

9. A system comprising:
    a memory; and
    a processor coupled to the memory, the processor configured to:
        receive a request for a digital certificate from a requester within an organization,
        provide the request to an approver within the organization,
        receive from the approver, an approval of the request,
        provide an approved request to an implementer within the organization,
        receive, from the implementer, technical information related to the approved request for generating a digital certificate based on the technical information,
        determine a computer on which the digital certificate is to be installed,
        provide an alert to the approver at a first time before an expiration date of the digital certificate, and
        determine if the approver has responded to the alert by a second time before the expiration date, and, if the approver has not responded, provide an alert to another party.

10. The system of claim 9, wherein the processor is configured to store certificate information related to the digital certificate in a database.

11. The system of claim 10, wherein the certificate information comprises the expiration date of the certificate.

12. The system of claim 9, wherein the processor is further configured to install the digital certificate on the computer.

13. The system of claim 10, wherein the processor is further configured to:
    transmit the digital certificate to an agent; and
    install by the agent, the digital certificate on the computer.

14. The system of claim 10, wherein the processor is further configured to:
  probe a plurality of computers to identify previously installed digital certificates;
  retrieve information about the previously installed digital certificates; and
  compare the information about the previously installed certificates to the stored certificate information to determine if any of the previously installed certificates comprise information different from the stored certificate information.

15. The system of claim 14, wherein the processor is further configured to transmit an alert regarding any previously installed certificates that comprise information different from the stored certificate information.

16. A non-transitory computer-readable medium comprising instructions that, when executed by a computer system, cause the computer system to perform operations comprising:

receiving a business request for a digital certificate from a requester within an organization;

providing the request to an approver within the organization;

providing upon approval of the request by the approver, the request to an implementer;

receiving from the implementer, technical information related to the approved request for generating a digital certificate based on the technical information;

providing a first alert to the approver at a first time before an expiration date of the digital certificate; and determining if the approver has responded to the first alert by a second time before the expiration date, and, if the approver has not responded, providing, by the computer system, a second alert to another party.

* * * * *